(12) United States Patent
Koulomzin

(10) Patent No.: US 9,294,479 B1
(45) Date of Patent: Mar. 22, 2016

(54) CLIENT-SIDE AUTHENTICATION

(75) Inventor: Daniel Koulomzin, Jamaica Plain, MA (US)

(73) Assignee: Google Inc., Mountain View, CA (US)

( * ) Notice: Subject to any disclaimer, the term of this patent is extended or adjusted under 35 U.S.C. 154(b) by 407 days.

(21) Appl. No.: 13/158,900

(22) Filed: Jun. 13, 2011

Related U.S. Application Data

(60) Provisional application No. 61/418,714, filed on Dec. 1, 2010.

(51) Int. Cl.
*G06F 15/16* (2006.01)
*H04L 29/06* (2006.01)

(52) U.S. Cl.
CPC ......... *H04L 63/0884* (2013.01); *H04L 63/0407* (2013.01); *H04L 63/0414* (2013.01); *H04L 63/0421* (2013.01); *H04L 63/0807* (2013.01); *H04L 63/0815* (2013.01)

(58) Field of Classification Search
CPC ............ H04L 63/0407; H04L 63/0414; H04L 63/0421; H04L 63/0884; H04L 63/0807; H04L 63/0815
See application file for complete search history.

(56) References Cited

U.S. PATENT DOCUMENTS

| | | | | |
|---|---|---|---|---|
| 5,999,124 | A * | 12/1999 | Sheynblat | 342/357.29 |
| 6,167,522 | A * | 12/2000 | Lee et al. | 726/2 |
| 6,209,026 | B1 * | 3/2001 | Ran et al. | 709/218 |
| 6,530,022 | B1 * | 3/2003 | Blair et al. | 713/186 |
| 6,691,232 | B1 * | 2/2004 | Wood | H04L 63/0815 726/18 |
| 6,731,625 | B1 * | 5/2004 | Eastep et al. | 370/352 |
| 7,240,192 | B1 * | 7/2007 | Paya | H04L 63/0807 713/152 |
| 7,334,039 | B1 * | 2/2008 | Majkut et al. | 709/229 |
| 7,346,917 | B2 * | 3/2008 | Gatto et al. | 725/5 |
| 7,350,231 | B2 * | 3/2008 | Madison | H04L 63/0807 726/10 |
| 7,461,150 | B1 * | 12/2008 | Boulia | 709/227 |
| 7,478,434 | B1 * | 1/2009 | Hinton et al. | 726/27 |
| 7,580,850 | B2 * | 8/2009 | Lurie | 705/7.26 |
| 7,743,132 | B2 * | 6/2010 | Tewari | H04L 12/14 709/213 |
| 7,890,427 | B1 * | 2/2011 | Rao et al. | 705/51 |
| 8,090,766 | B2 * | 1/2012 | DePue et al. | 709/203 |
| 8,185,931 | B1 * | 5/2012 | Reeves | 726/1 |
| 8,413,233 | B1 * | 4/2013 | Zheng et al. | 726/21 |
| 8,528,059 | B1 * | 9/2013 | Labana et al. | 726/5 |
| 8,626,804 | B2 * | 1/2014 | Xu | 707/817 |
| 8,635,701 | B2 * | 1/2014 | Hilaiel et al. | 726/25 |
| 8,713,641 | B1 * | 4/2014 | Pagan et al. | 726/4 |
| 2002/0007411 | A1 * | 1/2002 | Shaked et al. | 709/229 |
| 2002/0091926 | A1 * | 7/2002 | Fukutomi | 713/170 |
| 2002/0104015 | A1 * | 8/2002 | Barzilai et al. | 713/201 |

(Continued)

*Primary Examiner* — Krista Zele
*Assistant Examiner* — Anthony Fabbri
(74) *Attorney, Agent, or Firm* — Fox Rothschild LLP

(57) ABSTRACT

A system and method for client-side authentication is disclosed. A client device comprises a browser and an authentication module. The browser is configured to receive a cookie and a timestamp via the network and determine a plug-in ID. The authentication module is communicatively coupled to the browser to receive the cookie, the timestamp and the plug-in ID. The authentication module determines a signing key and a public ID based at least in part on the cookie. The authentication module signs the timestamp, plug-in ID and the public ID using the signing key. The authentication module concatenates the public ID, the timestamp, the plug-in ID and the signature to form an authenticated plug-in URL using the security token. The browser loads the authenticated plug-in URL to display a plug-in and begin an authenticated session that expires at a time specified by the time-based security token.

22 Claims, 4 Drawing Sheets

(56) References Cited

U.S. PATENT DOCUMENTS

| | | | |
|---|---|---|---|
| 2002/0120573 A1* | 8/2002 | McCormick | 705/50 |
| 2002/0138728 A1* | 9/2002 | Parfenov | H04L 63/0815 713/170 |
| 2002/0156909 A1* | 10/2002 | Harrington | 709/231 |
| 2002/0186249 A1* | 12/2002 | Lu et al. | 345/781 |
| 2003/0065941 A1* | 4/2003 | Ballard et al. | 713/201 |
| 2003/0074456 A1* | 4/2003 | Yeung et al. | 709/229 |
| 2003/0079008 A1* | 4/2003 | Fujii et al. | 709/223 |
| 2003/0084170 A1* | 5/2003 | de Jong et al. | 709/229 |
| 2003/0084171 A1* | 5/2003 | de Jong et al. | 709/229 |
| 2003/0084288 A1* | 5/2003 | de Jong et al. | 713/168 |
| 2003/0105981 A1* | 6/2003 | Miller | G06F 21/41 726/8 |
| 2003/0115267 A1* | 6/2003 | Hinton | G06F 21/41 709/204 |
| 2003/0140230 A1* | 7/2003 | de Jong et al. | 713/182 |
| 2003/0152207 A1* | 8/2003 | Ryan | 379/201.04 |
| 2003/0200465 A1* | 10/2003 | Bhat | H04L 63/0815 726/8 |
| 2004/0034502 A1* | 2/2004 | Jung | 702/178 |
| 2004/0117349 A1* | 6/2004 | Moricz | G06F 17/30899 |
| 2004/0162787 A1* | 8/2004 | Madison | G06F 21/10 705/64 |
| 2005/0033745 A1* | 2/2005 | Wiener | G06F 17/3061 |
| 2005/0065855 A1* | 3/2005 | Geller | 705/26 |
| 2005/0108330 A1* | 5/2005 | Sakaguchi | H04L 12/1827 709/205 |
| 2005/0114666 A1* | 5/2005 | Sudia | 713/175 |
| 2005/0204041 A1* | 9/2005 | Blinn | H04L 63/0815 709/225 |
| 2005/0246278 A1* | 11/2005 | Gerber et al. | 705/44 |
| 2005/0283443 A1* | 12/2005 | Hardt | H04L 63/0815 705/67 |
| 2006/0048214 A1* | 3/2006 | Pennington et al. | 726/5 |
| 2006/0070117 A1* | 3/2006 | Spalink et al. | 726/3 |
| 2006/0185021 A1* | 8/2006 | Dujari | H04L 63/08 726/27 |
| 2006/0282662 A1* | 12/2006 | Whitcomb | 713/156 |
| 2007/0198674 A1* | 8/2007 | Li et al. | 709/223 |
| 2007/0261116 A1* | 11/2007 | Prafullchandra | H04L 63/102 726/22 |
| 2008/0028206 A1* | 1/2008 | Sicard et al. | 713/156 |
| 2008/0059804 A1* | 3/2008 | Shah | G06F 21/41 713/186 |
| 2008/0201413 A1* | 8/2008 | Sullivan et al. | 709/203 |
| 2009/0132813 A1* | 5/2009 | Schibuk | 713/158 |
| 2009/0157531 A1* | 6/2009 | Bui | G06Q 20/02 705/26.1 |
| 2009/0235347 A1* | 9/2009 | Syed | H04L 9/3213 726/10 |
| 2009/0282241 A1* | 11/2009 | Prafullchandra | H04L 67/306 713/156 |
| 2009/0300723 A1* | 12/2009 | Nemoy et al. | 726/4 |
| 2010/0008363 A1* | 1/2010 | Ee et al. | 370/392 |
| 2010/0313009 A1* | 12/2010 | Combet et al. | 713/150 |
| 2012/0158954 A1* | 6/2012 | Heffernan et al. | 709/224 |
| 2012/0297017 A1* | 11/2012 | Livshits et al. | 709/217 |

* cited by examiner

CLIENT-SIDE AUTHENTICATION

CROSS REFERENCE TO RELATED APPLICATIONS

This application claims priority under 35 USC §119(e) to U.S. Application Ser. No. 61/418,714, entitled "Client-Side Authentication" filed Dec. 1, 2010, the entirety of which is herein incorporated by reference.

BACKGROUND

The specification relates to a system and method for authenticating online communications. In particular, the specification relates to client-side authentication of communications.

Websites increasingly include plug-ins authored by third parties. These third parties are not trusted by the website and the client devices that access the website. For this reason, among others, the website and the client devices cannot trust the plug-ins with their credentials. However, the plug-in (or the third-party server that hosts the plug-in) must be able to make certain privileged requests on behalf of the website or the client devices. Current solutions to this problem require a trusted server that does not host either the plug-in or the website to perform authentication of the plug-in requests.

A first problem present in existing authentication solutions is that they require extra time (approximately two hundred milliseconds) for the trusted server to perform the authentication step. The longer the authentication, the more time it takes to serve the user the requested content.

A second problem in existing authentication solutions is that they require the client device to trust a third party to protect the client device from unauthorized use of client information. Because the third party is motivated by personal gains, the third party can commit malfeasance if given the client credentials.

A third problem present in existing authentication solutions is that they do not permit client input in the period of time in which the authentication sessions lasts.

SUMMARY OF THE INVENTION

The technology described in the specification overcomes the deficiencies and limitations of the prior art at least in part by providing a system and method for client-side authentication that protects a user's credentials. A client device comprises a browser and an authentication module. The browser is communicatively coupled to a network. The browser is configured to receive a cookie and a timestamp via the network and determine a plug-in identifier (ID). The authentication module is communicatively coupled to the browser to receive the cookie, the timestamp and the plug-in ID. In one embodiment the timestamp is an indication of a time at which the client signed in to the website. The authentication module is communicatively coupled to the browser to receive the cookie, the timestamp and the plug-in ID. The authentication module determines a signing key and a public ID based at least in part on the cookie. The authentication module concatenates the timestamp, plug-in ID and the public ID. The authentication module signs the data, for example by hashing the timestamp, plug-in ID, the public ID and the signing key. The authentication module forms the security token by concatenating the plug-in ID, the public ID and the timestamp using the hash. The signing key is omitted from the concatenation step because, in one embodiment, the signing key remains secret. The authentication module uses the security token to form an authenticated plug-in uniform resource locator (URL). The browser loads the authenticated plug-in URL to display a plug-in and begin an authenticated session. The authenticated session expires at a time specified by the time-based security token. In one embodiment, a trusted server that is communicatively coupled to the network transmits the timestamp and the cookie to the browser.

In one embodiment, a web server that is communicatively coupled to the network hosts a website that is configured to require the client device to sign in to the website upon the client device requesting access to the website. The website is embedded with a plug-in that is not trusted by the client device and the signing key is not known to the plug-in.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
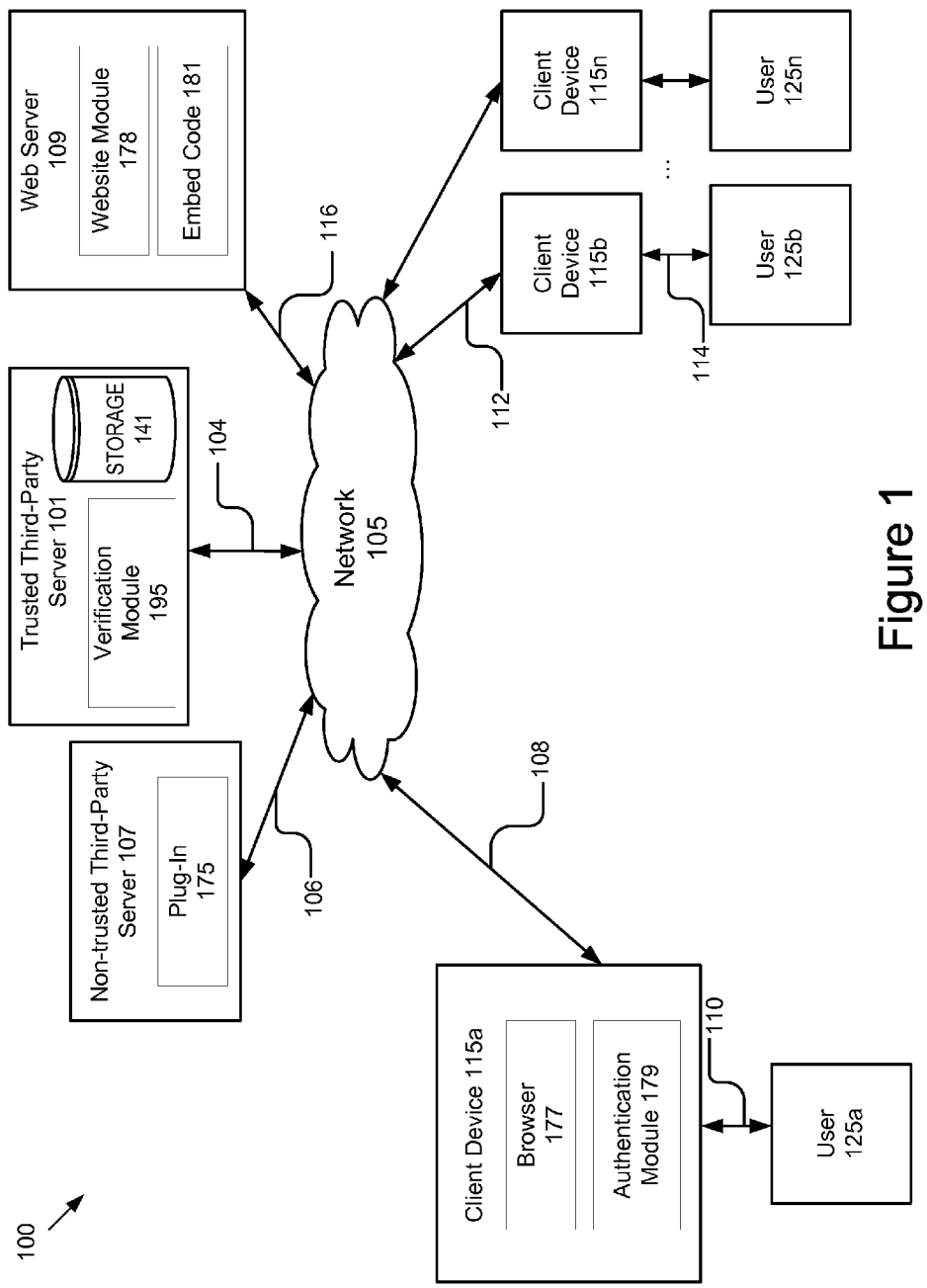
FIG. 1 is a high-level block diagram illustrating one embodiment of a system for client-side authentication.

A system and method for client-side authentication is described below. In the following description, for purposes of explanation, numerous specific details are set forth in order to provide a thorough understanding. It will be apparent, however, to one skilled in the art that the technology described in the embodiments can be practiced without these specific details. In other instances, structures and devices are shown in block diagram form in order to avoid obscuring the description. For example, the specification is described in one embodiment below with reference to user interfaces and particular hardware. However, the specification applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the description is implemented in software, which includes but is not limited to firmware, resident software, microcode, etc.

Furthermore, the specification can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

System Overview

FIG. 1 illustrates a block diagram of a system 100 for client-side authentication according to an example embodiment of the specification. The system 100 includes client devices 115a, 115b, 115n that are accessed by users 125a, 125b, 125n, a trusted third-party server 101 ("trusted server 101"), a non-trusted third-party server 107 ("non-trusted server 107") and a web server 109. In the illustrated embodiment, these entities are communicatively coupled via a network 105. Although only three client devices 115a, 115b, 115n are illustrated, persons having ordinary skill in the art will recognize that any number of client devices 115n are available to any number of users 125n. Persons having ordinary skill in the art will also appreciate that any number of users 125n can use (or access) a single client device 115n. Furthermore, while only one network 105 is coupled to the client devices 115a, 115b, 115n, the trusted server 101, the web server 109 and the non-trusted server 107, in practice any number of networks 105 can be connected to the trusted server 101, the web server 109 and the non-trusted server 107. Persons having ordinary skill in the art will also appreciate that while only one trusted server 101 and one non-trusted server 107 are depicted in FIG. 1, the system 100 could include one or more trusted servers 101 and one or more non-trusted servers 107.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. For example, the network is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In the illustrated embodiment, the client device 115a is communicatively coupled to the network 105 via signal line 108. The user 125a interacts with the client device 115a as represented by signal line 110. Similarly, the client device 115b is coupled to the network 105 via signal line 112. Client device 115n and user 125n are coupled and interact in a similar manner. The user 125b interacts with the client device 115b as represented by signal line 114. The non-trusted server 107 is communicatively coupled to the network 105 via signal line 106. The trusted server 101 is communicatively coupled to the network 105 via signal line 104. The web server 109 is communicatively coupled to the network 105 via signal line 116.

The trusted server 101 is a hardware server device. For example, the trusted server 101 is hardware server operated by Google® of Mountain View, Calif. In one embodiment, the trusted server 101 sends and receives data to and from one or more of the client devices 115a, 115b, 115n via the network 105. For example, the trusted server 101 is a hardware server that provides the Google® Friend Connect service to the client devices 115a, 115b, 115n. A person having ordinary skill in the art will recognize that the trusted server 101 can be configured to provide different services and/or functionality to the client devices 115a, 115b, 115n.

In one embodiment, the trusted server 101 is a device that is trusted by the users 125a, 125b, 125n of the client devices 115a, 115b, 115n. For example, the users 125a, 125b, 125n of the client devices 115a, 115b, 115n share data and/or other information about the users 125a, 125b, 125n and/or the client devices 115a, 115b, 115n with the trusted server 101.

In one embodiment, the trusted server 101 comprises, among other things, a storage device 141 and a verification module 195. The storage device 141 is a non-transitory memory that stores data such as cookies and timestamps. In another embodiment the trusted server 101 additionally comprises a processor (not pictured), a clock (not pictured) used to generate timestamps and other components conventional to a hardware server device.

The verification module 195 is code and routines that communicate with the plug-in 195 to determine if a client-side signed hash was produced by a signing key 243. The verification module 195 is communicatively coupled to the plug-in 175 to receive a request and/or a hash from the plug-in 175. In one embodiment, the verification module 195 is also communicatively coupled to the storage 141 to access a signing key 243 stored in the storage 141. For example, the storage 141 stores, among other things, a signing key 243 associated with a particular client device 115a, 115b, 115n. The verification module 195 communicates with the storage 141 to retrieve the signing key 243. The verification module 195 analyzes the client-side signed hash to determine if the hash was generated using the signing key 243 associated with the client device 115a, 115b, 115n. Methods and systems for determining whether a keyed hash such as the client-side signed hash was generated using a signing key 243 are known to those having skill in the art. The client-side signed hash and the signing key 243 are described in further detail with reference to FIGS. 2, 3 and 4. In another embodiment, the verification module 195 communicate with the plug-in 195 to determine if a client-side signed hash was produced using a verification key that is public and known to the plug-in 175. This is known as an asymmetric cryptographic signing system.

In one embodiment, the trusted server 101 provides a website (e.g., a website represented by website module 178) with access to a service offered by a third-party (e.g., a third-party service represented by plug-in 175).

The storage device 141 comprises a list (or database) of websites that are registered with the trusted server 101. The website includes a link (or other input means) to access the third-party service. The website is accessed by a client device (e.g., client device 115a). The third-party service requests data about the client device. The trusted server 101 communicates with the website and/or a client device (e.g., client device115a) accessing the website to authenticate, among other things, requests for data received from the third-party service about the client device. This authentication is described in further detail below.

The web server 109 is a hardware server device. The web server 109 comprises a website module 178 and an embed code 181. The website module 178 is code and routines that, when executed by a processor (not pictured), generates a website (not pictured) that is hosted by the web server 109. For example, the web server 109 hosts a website generated based on the website module 178, and the website is accessed by the browser 177 operating on the client device 115a via the network 105. The website module 178 is stored on a non-transitory memory associated with the web server 109. In one embodiment, the website is registered with the trusted server 101 and the trusted server 101 provides the web site with access to different services. For example, the website is registered with Google® Friend Connect (represented in this example by trusted server 101) and Google® Friend Connect provides the website with access to a plug-in service (represented by plug-in 175) offered by the non-trusted server 107. The embed code 181 is code and routines embedded in the website module 178. The embed code 181 is any code or routines configured to enable the website module 179 to communicate with the plug-in module 175 so that the website module 178 and/or the client device 115a, 115b, 115n can use the service provided by plug-in 175. The embed code 181 communicates with the plug-in 175 to provide the plug-in service to the website. For example, the embed code 181 is a line of HyperText Markup Language code ("HTML code") that is configured to communicate with the plug-in 175 to exchange data, information and/or commands. Persons having ordinary skill in the art will recognize that other types of embed code 181 are possible.

In one embodiment, the web server 109 is a device that is trusted by the users 125a, 125b, 125n of the client devices 115a, 115b, 115n. For example, the users 125a, 125b, 125n of the client devices 115a, 115b, 115n share data and/or other information about the users 125a, 125b, 125n and/or the client devices 115a, 115b, 115n with the web server 109. In another embodiment, the users 125a, 125b, 125n of the client devices 115a, 115b, 115n implicitly trust the web server 109 because they access the website hosted by the web server 109.

The non-trusted server 107 is a hardware server device. The non-trusted server 107 comprises a plug-in 175. The plug-in 175 is code and routines that, when executed by a processor (not pictured), provides a service (i.e., web content) that is embedded in a web page (e.g., a web page that is part of the website hosted by web server 109). The plug-in 175 is stored on a non-transitory memory associated with the non-trusted server 107. In one embodiment, the plug-in 175 provides a service without needing an independent application to be launched, but instead is run in an environment that manages multiple plug-ins. For example, the plug-in 175 is a gadget such as a Google® Gadget. A Google® Gadget is dynamic web content that is embedded in a web page. For example, the non-trusted server 107 is a hardware server operated by a third-party that provides a plug-in service (e.g., Google® Gadget) to the website hosted by the web server 109. The website is registered with the trusted server 101 and the trusted server 101 provides the web site with access to different services, including the plug-in 175. For example, the website is registered with Google® Friend Connect (represented in this example by trusted server 101) and Google® Friend Connect provides the website with access to a plug-in service (represented by plug-in 175) offered by the non-trusted server 107. The website is accessed by the client device 115a and the processor-based execution of the plug-in 175 causes the non-trusted server 107 to request data and/or information about the client device 115a. As described below, the client device 115a comprises an authentication module 179 that communicates with the trusted server 101 and/or the website (represented by website module 178) to authenticate the request received from the non-trusted server 107.

In one embodiment, the non-trusted server 107 is a device that is not trusted by the users 125a, 125b, 125n of the client devices 115a, 115b, 115n. For example, the users 125a, 125b, 125n of the client devices 115a, 115b, 115n have not authorized the trusted server 101 and/or the web server 107 to share data and/or information about the users 125a, 125b, 125n and/or client devices 115a, 115b, 115n with the non-trusted server 107.

The client device 115a, 115b, 115n is any computing device. For example the client device 115a, 115b, 115n is a personal computer ("PC"), smart phone, tablet computer (or tablet PC), etc. One having ordinary skill in the art will recognize that other types of client devices 115a, 115b, 115n are possible. In one embodiment, the system 100 comprises a combination of different types of client devices 115a, 115b, 115n. For example, a first client device 115a is a smart phone, a second client device 115b is a personal computer and a plurality of other client devices 115n is any combination of a personal computer, a smart phone and a tablet computer.

The client device 115a, 115b, 115n comprises a browser 177 and an authentication module 179. In one embodiment, the browser 177 is code and routines stored in a memory 115a, 115b, 115n and executed by a processor of the client device 115a, 115b, 115n. For example, the browser 177 is a browser application such as Google Chrome. In one embodiment, the browser 177 comprises a memory for storing data (e.g., a cookie). The authentication module 179 is described in more detail with reference to FIGS. 2, 3 and 4. The user 125a, 125b, 125n is a human user of the client device 115a, 115b, 115n.

Authentication Module

Figure 2:
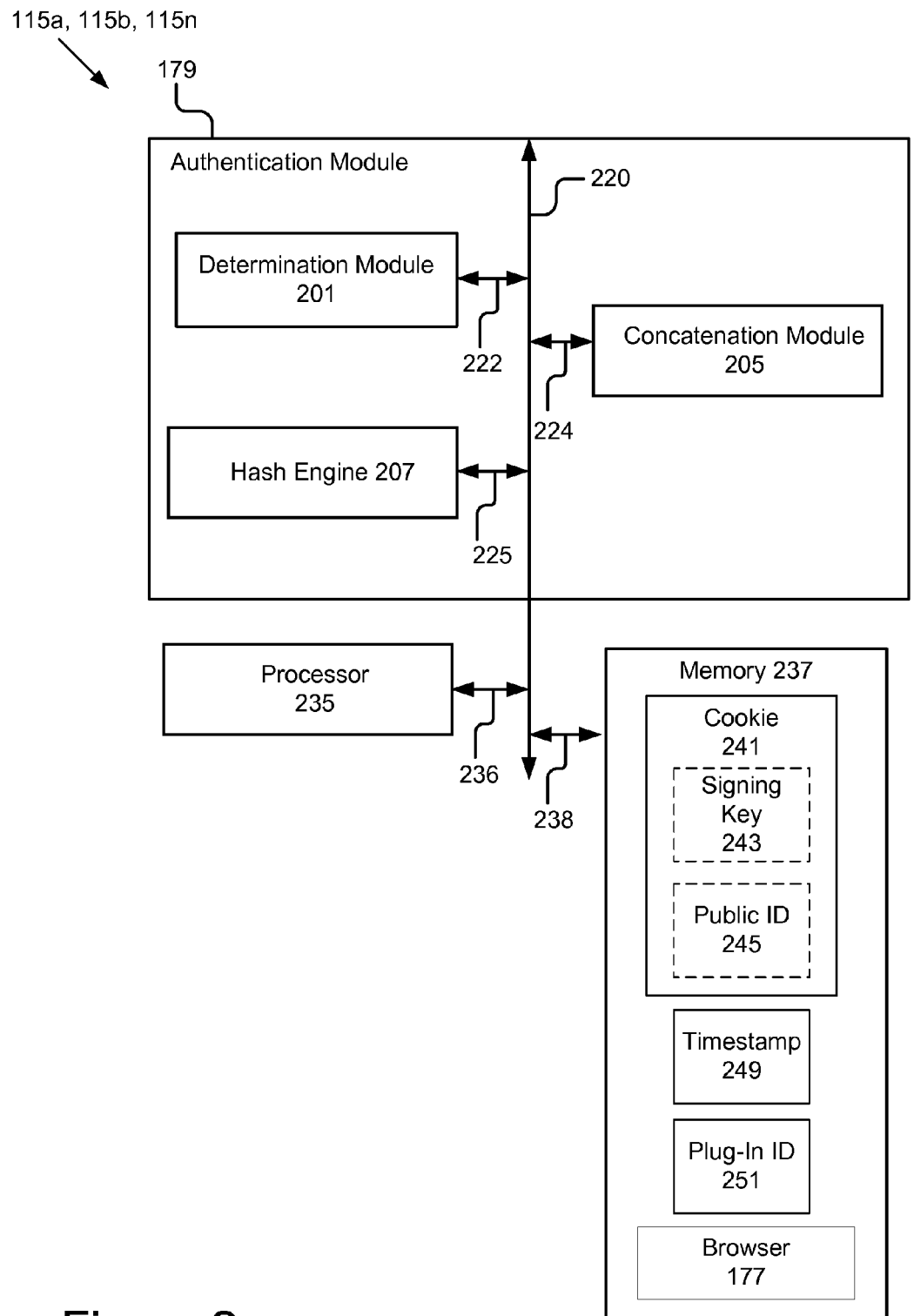
FIG. 2 is a block diagram illustrating one embodiment of an authentication module.

Referring now to FIG. 2, the authentication module 179 is shown in more detail. FIG. 2 is a block diagram of a client device 115a, 115b, 115n that includes the authentication module 179, a processor 235 and memory 237. The processor 235 comprises an arithmetic logic unit, a microprocessor, a general purpose controller or some other processor array to perform computations, execute the browser 177, etc. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 236.

The memory 237 stores instructions and/or data that may be executed by the processor 235. For example, the memory 237 stores the browser 177 described above with reference to FIG. 1. The memory 237 is communicatively coupled by the bus 220 for communication with the other components of client device 115a, 115b, 115n. In one embodiment, the instructions and/or data comprises code for performing any and/or all of the techniques described herein. The memory 237 is a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other non-volatile storage device known in the art. The memory 237 is communicatively coupled to the bus 220 via signal line 238. In one embodiment, the memory 237 stores other components. For example, the memory 237 stores a cookie 241 and a timestamp 249. The cookie 241 and the timestamp 249 are described below with reference to the authentication module 179.

The authentication module 179 comprises a determination module 201, a concatenation module 205 and a hash engine 207. The authentication module 179 communicates with other devices via the browser 177. For example, the browser 177 communicates with the non-trusted server 107, the trusted server 101 and/or the web server 109 via the network 105. The browser 177 sends data to these devices 107, 101, 109 and receives data and/or information from these devices 107, 101, 109 via the network 105. The browser 177 also computes Universal Resource Locators ("URL" if singular or "URLs" if plural) for communicating with these devices 107, 101, 109. In the depicted embodiment, the authentication module 179 communicates with the browser 177 via the bus 220 and the signal line 238. In one embodiment, the authentication module 179 is comprised within the browser 177.

In one embodiment, the browser 177 communicates with the web server 109 via the network 105 to enable the client device 115a to access the website hosted by the web server 109 (described above with reference to FIG. 1). The website is embedded with the embed code 181 so that the website includes the service provided by the plug-in 175. The website requests that the client 115a sign in to the website. The user 125a provides one or more inputs to the client device 115a to sign in to the website. The browser 177 communicates these inputs to the web server 109. The web server 109 communicates the sign in event to the trusted server 101, and the trusted server 101 generates a timestamp 249. For example, the web server 109 sends a notification of the sign in event to the trusted server 101 responsive to the inputs received from the browser 177 and the trusted server 101 generates a timestamp 249 responsive to the notification. The trusted server 101 sends the timestamp 249, a cookie 241 and a plug-in identifier 251 ("plug-in ID 251") to the browser 177 of the client device 115a via the network 105. In one embodiment: (1) the cookie 241 is stored on the browser 177; and (2) the timestamp 249 and the plug-in ID 251 are stored on the memory 237. A person having ordinary skill in the art will recognize that the timestamp 249, cookie 241 and plug-in ID 251 can be stored in different locations. For example, the timestamp 249, the cookie 241 and the plug-in ID 251 are stored on the browser 177. Alternatively, the browser 177 stores one or more of the timestamp 249, the cookie 241 and the plug-in ID 251 on the memory 237 and any remaining data on the browser 177 (wherein the "remaining data" are any of the timestamp 249, the cookie 241 and the plug-in ID 251 that are not stored on the memory 237).

The timestamp 249 is an indication of a date and/or time. For example, the timestamp 249 is a sequence of characters indicating the date and/or time at which a certain event occurred. In one embodiment, the timestamp 249 indicates the time at which the client 115a signed in to the website hosted by the web server 109.

The cookie 241 is text data containing one or more bits of information. In the depicted embodiment, the cookie 177 comprises a signing key 243 and a public identifier 245 ("public ID 245"). In one embodiment, the combination of the signing key 243 and the public ID 245 are unique to the combination of the website (represented by website module 178) and the user 115a. The signing key 243 is a private key that is not known to the public. For example, the non-trusted server 107, the plug-in 175, the web server 109 and the website module 178 do not have access to or information describing the signing key 243, whereas the trusted server 101 and the client device 115a have access to the signing key 243. In contrast, the public ID 245 is an identifier that is known or capable of being known to the public. Accordingly, the cookie 241 includes a private component (i.e., the signing key 243) and a public component (i.e., the public ID 245). The plug-in ID 251 is a URL for the plug-in 175.

In one embodiment, trusted server 101 includes codes and routines for generating the cookie 241 based on the signing key 243 and the public ID 245 stored in the storage 141. The trusted server 101 communicates with the browser 177 to send the cookie 241 to the browser 177.

In one embodiment, the public ID 245 is a combination of a user identifier ("user ID") and a community identifier ("community ID"). For example, the website hosted by web server 109 is a website registered with Google® Friend Connect as represented by the trusted server 101 depicted in FIG. 1. The public ID 245 is a user ID for the user 125a of the client device 115a registered with Google® Friend Connect and the community ID is an identifier for the website as registered with Google® Friend Connect.

The determination module 201 is code and routines for determining the signing key 244 and the public ID 245 from the cookie 241. For example, the determination module 201 is a parser that parses the signing key 244 and the public ID 245 from the text of the cookie 241. Persons having ordinary skill in the art will recognize that the determination module 201 can implement different techniques to determine the public ID 245 from the cookie 241. The determination module 201 is communicatively coupled to bus 220 via signal line 222. In one embodiment, the determination module 201: (1) retrieves the cookie 241 from the memory 237 via the bus 220; (2) provides the signing key 244 to the hash engine 241 via the bus 220; and (3) provides the public ID 245 to the concatenation engine 241 via the bus 220.

The concatenation module 205 is code and routines for concatenating two or more character strings end-to-end. Examples of character strings include, in one embodiment, the public ID 245, the timestamp 249 and the plug-in ID 251. One having ordinary skill in the art will recognize that other character strings are possible. In one embodiment, the concatenation module 205 concatenates the public ID 245, the timestamp 249 and the plug-in ID 251 to form an intermediate plug-in URL. The concatenation module 205 is communicatively coupled to bus 220 via signal line 224. In one embodiment, the concatenation module 205: (1) retrieves the timestamp 249 and the plug-in ID 251 via the bus 220; (2) receives the public ID 245 from the determination module 201 via the bus 220; and (3) provides the intermediate plug-in URL to the hash engine 241 via the bus 220.

The hash engine 241 is code and routines for signing data. For example, the hash engine 241 hashes data to generate a cryptographically verifiable identifier (referred to herein as "client-side signed hash"). The client-side signed hash is a signature because it is computable only by a party that knows the signing key and the data. In one embodiment, the hash engine 241 is a Hash-based Message Authentication Code ("HMAC") that hashes data in combination with a secret key to generate the client-side signed hash. One having ordinary skill in the art will recognize that other types of hash engines 241 are possible. In one embodiment, the hash engine 241 uses the signing key as the secret key to hash the intermediate plug-in URL to form the client-side signed hash. In another embodiment, the client side signed hash is generated by the hash engine 241 using asymmetric cryptographic signing techniques.

In one embodiment, the client-side signed hash is a time-based security token. The time-based security token differs from other security tokens in that it expires at a time determined at least in part by the timestamp 249. In one embodiment, the time-based security token expires at a predetermined period of time after the time indicated by the timestamp 249. For example, as described above, the timestamp 249 indicates the time at which the client device 115a signed in to the website and the time-based security token expires six hours after the time indicated by the timestamp 249. In one embodiment, the timestamp 249 is a predetermined time for the time-based security token to expire. For example, the timestamp 249 is configured by the server 101 to indicate a date and time that occurs a predetermined period of time after the client device 115a signs in to the website (such as six hours after the client 115a signs in to the website), and the time-based security token is configured to expire at the time indicated by the timestamp 249. Persons having ordinary skill in the art will recognize that there are other techniques for configuring the time-based security token based on the timestamp 249. In one embodiment, the verification module 195 receives the time-based security token from the plug-in 175 each time the plug-in 175 requests information about the user 125a, 125b, 125n and/or the client device 115a, 115b, 115n and the verification module 195 checks to see if the time-based security token has expired. If the time-based security token has expired, then the plug-in 175 is denied access to the requested information. In one embodiment, the client-side signed hash includes additional information that the client device 115a, 115b, 115n or the web site module 178 include in the hash. This additional information is made available to the plug-in 175 and the trusted server 101 via the client-side signed hash. The additional information includes any information capable of being encoded in the hash. For example, the client-side signed hash includes a URL for the website module 178.

In one embodiment, the hash engine 241 is communicatively coupled to the memory 237 via the bus 220 and the signal line 238 to: (1) receive the signing key from the determination module 201 via the bus 220; (2) receive the intermediate plug-in URL from the concatenation module 205 via the bus 220; and (3) provide the client-side signed hash to the concatenation module 205 via the bus 220.

The concatenation module 205 has stored (or retrieves from memory 237) a copy of the plug-in ID 251, the public ID 245 and the timestamp 249. The concatenation module 205 receives the client-side signed hash from the hash engine 241. The concatenation module 205 concatenates the plug-in ID 251, the public ID 245, the timestamp 249 and the client-side signed hash to form the authenticated plug-in URL. The authenticated plug-in URL includes the client-side signed hash. In one embodiment, the client-side signed hash is a time-based security token as described above. The concatenation module 205 is communicatively coupled to the browser 177 via the bus to send the authenticated plug-in URL to the browser 177.

The browser 177 loads the authenticated plug-in URL. The plug-in 175 obtains the client-side signed hash from the authenticated plug-in URL. The plug-in 175 determines the plug-in ID 251, the public ID 245, the timestamp 249 and the client-side signed hash (described below collectively as "the above-described data") based on the authenticated plug-in URL. For example, the plug-in 175 includes or has access to a parser that parses the above-described data from the authenticated plug-in URL. The plug-in 175 makes a request to the trusted server 101 that includes the above-described data. For example, the plug-in 175 communicates with the verification module 175. The trusted server 101 verifies that the client device 115a requested the display of the plug-in 175 by determining whether the client-side signed hash was produced by the signing key 243. For example, the verification module 195 determines whether the client-side signed hash was produced by the signing key 243. Since the signing key 243 is not known to the plug-in 175, the plug-in 175 is not able to forge the client-side signed hash. The trusted server 101 communicates with the plug-in 175 and/or the web server 109 to cause the plug-in 175 to be displayed on a display (e.g., monitor) associated with the client device 115a responsive to a determination that the request from the plug-in 175 included a client-side signed hash that was produced by the signing key 243, i.e., that the plug-in 175 is authenticated by the client device 115a. If the plug-in 175 is not authenticated by the client device 115a, the trusted server 110 does not cause the plug-in 175 to be displayed on the display associated with the client device 115a.

Once communications with the plug-in 175 are authenticated, an authenticated session begins. In one embodiment, the client-side signed hash is a time-based security token, and the authenticated session expires (i.e., the plug-in 175 ceases to be authorized) at the time indicated by the time-based security token. In one embodiment, the verification module 195 also authorizes the plug-in 175 to perform sensitive reads and modifications on the client device's 115a and the web server's 109 behalf while the time-based security token is valid. For example, the plug-in 175 is able to transmit, based on the security token, the client device's 115a or the web server's 109 information to another system, such as a data-hosting system in a way that the data-hosting service can trust.

Methods

Figure 3:
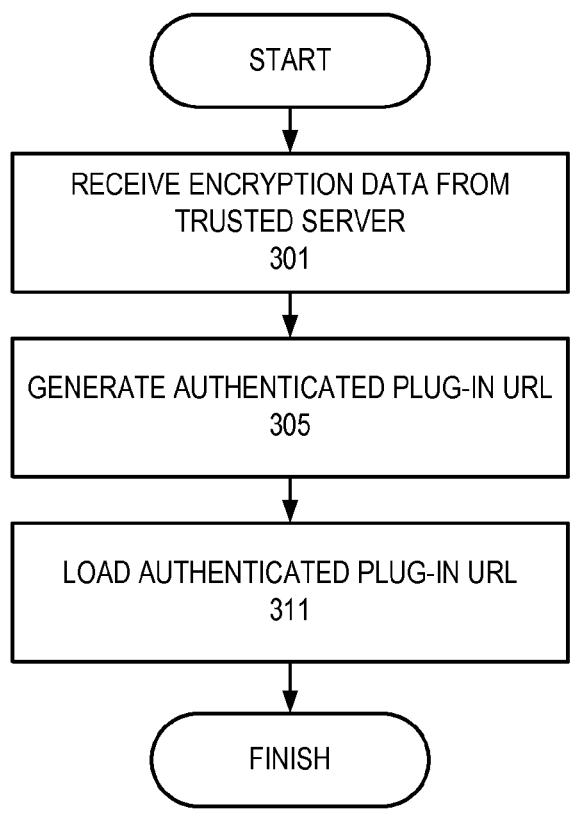
FIG. 3 is a flow diagram of one embodiment of a method for client-side authentication.
Figure 4:
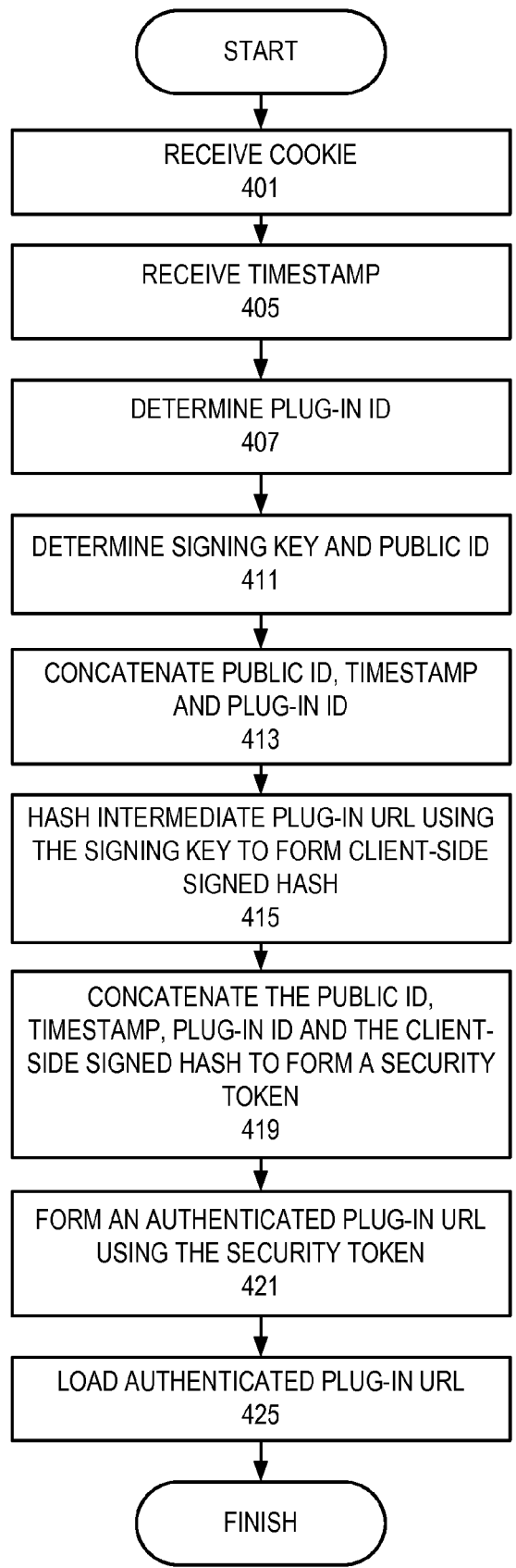
FIG. 4 is a flow diagram of another embodiment of a method for client-side authentication.

Referring now to FIGS. 3 and 4, various example embodiments will be described. FIG. 3 is a flow diagram 300 of one embodiment of a method for client-side authentication. The browser 177 receives 301 the encryption data from the trusted server 101. In one embodiment, encryption data includes the cookie 241 and the timestamp 249. In another embodiment, the encryption data includes the cookie 241, the timestamp 249 and the plug-in ID 251. The browser 177 sends the encryption data to the authentication module 179. The authentication module 179 generates 305 the authenticated plug-in URL. The browser 177 loads 311 the authenticated plug-in URL. The plug-in 175 and the trusted server 101 take steps as described above with reference to FIG. 2.

FIG. 4 is a flow diagram 400 on one embodiment of a method for client-side authentication. The browser 177 receives 401 the cookie 241 from the trusted server 101. The browser 177 receives 405 the timestamp 249 from the trusted server 101. The browser 177 determines 407 the plug-in ID 251. For example, the browser 177 determines the URL for the plug-in from an address bar of the browser 177. In one embodiment, the browser 177 receives the plug-in ID 251 from one of the trusted server 101, the non-trusted server 107 and the website 109. The browser 177 sends the cookie 241 to the determination module 201. The browser 177 sends the timestamp 249 and the plug-in ID 251 to the concatenation module 205. In one embodiment, the browser 177 stores one or more of the cookie 241, the timestamp 249 and the plug-in ID 251 in the memory 237 or the browser cache.

The determination module 201 receives the cookie 241 from the browser 177. In one embodiment, the determination module 201 retrieves the cookie 241 from either the memory 237 or the browser cache. The determination module 201 determines 411 the signing key 243 and the public ID 245 from the cookie 241. The determination module 201 sends the signing key 243 to the hash engine 207 and the public ID 245 to the concatenation module 205. In one embodiment, the determination module 201 stores the signing key 243 and/or the public ID 245 in the memory 237 or the browser cache.

The concatenation module 205 receives the public ID 245 from the determination module 205. The concatenation module 205 receives the timestamp 249 and the plug-in ID 251 from the browser 177. In one embodiment, the concatenation module 205 retrieves one or more of the public ID 245, the timestamp 249 and the plug-in ID 251 from either the memory 237 or the browser cache. The concatenation module 205 concatenates 413 the public ID 245, the timestamp 249 and the plug-in ID 251 to form an intermediate plug-in URL. The concatenation module 205 sends the intermediate plug-in URL to the hash engine 207. In one embodiment, the concatenation module 405 stores the intermediate plug-in URL in the memory 237 or the browser cache. In one embodiment, the concatenation module 205 retains a copy of the plug-in ID 251 for later use.

The hash engine 207 receives the signing key 243 from the browser 177 and the intermediate plug-in URL from the concatenation module 205. In one embodiment, the hash engine 207 retrieves the signing key 243 and/or the intermediate plug-in URL from either the memory 237 or the browser cache. The hash engine 207 signs the data by hashing 415 the intermediate plug-in URL using the signing key 243 to form the client-side signed hash. In one embodiment, the client-side signed hash is a time-based security token as described above with reference to FIG. 2. The hash engine 207 sends the client-side signed hash to the concatenation module 205. In one embodiment, the hash engine 207 stores the client-side signed hash in the memory 237 or the browser cache.

The concatenation module 205 receives the client-side signed hash from the hash engine 207. In one embodiment, the concatenation module 205 retrieves the client-side signed hash from the memory 237 or the browser cache. The concatenation module 205 has a stored copy of the plug-in ID 251. In one embodiment, the concatenation module 205 retrieves a stored copy of the plug-in ID 251 from the memory 237 or the browser cache. The concatenation module 205 concatenates 419 the public ID 245, the timestamp 249, the plug-in ID 251 and the client-side signed hash to form a security token. The concatenation module 205 forms 421 an authenticated plug-in URL using the security token. The concatenation module 205 sends the authenticated plug-in URL to the browser 177. In one embodiment, the concatenation module 205 stores the authenticated plug-in URL in either the memory 237 or the browser cache.

The browser 177 receives the authenticated plug-in URL from the concatenation module 205. In one embodiment, the browser 177 retrieves the authenticated plug-in URL from the memory 237 or the browser cache. The browser 177 loads 425 the authenticated plug-in URL as described above for FIG. 2. In one embodiment, step 425 begins an authenticated session that expires based on the time-based security token (i.e., the client-side signed hash) included with the authenticated plug-in URL as described above for FIG. 2.

In one embodiment, the authenticated plug-in URL includes additional data. For example, in addition to the data described above, the authenticated plug-in URL includes one or more of: (1) specific kinds of data that may or may not be shared with the plug-in 175; (2) a specific internet proxy address or other machine identifiers that identify who can make requests for the confidential information about the client device 115a, 115b, 115n; and (3) a predetermined number of requests that the plug-in 175 can make before the authorized session expires.

In one embodiment, the authentication module 179 is used with a browser 177 to sign any data or combination of data that is sent to a party that is not trusted by the client device 115*a*, 115*b*, 115*c*.

The foregoing description of the example embodiments has been presented for the purposes of illustration and description. It is not intended to be exhaustive or to limit the specification to the precise form disclosed. Many modifications and variations are possible in light of the above teaching. It is intended that the scope of the specification be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure of the specification is intended to be illustrative, but not limiting, of the scope of the specification, which is set forth in the following claims.

What is claimed is:

1. A computer-implemented method for client-side authentication, the method comprising:
   at a client device:
      receiving a cookie, and a timestamp from a trusted server that is trusted by a user of the client device,
      associating a plug-in identifier (ID) to correspond to a single plug-in that invokes a web service provided by a non-trusted server that is not trusted by the user of the client-side computer,
      determining, with the one or more processors, a signing key and a public ID based at least in part on the cookie,
      concatenating, with the one or more processors, the timestamp, the plug-in ID and the public ID to form an intermediate plug-in uniform resource locator (URL),
      hashing, with the one or more processors, the intermediate plug-in URL using the signing key to form a client-side signed hash,
      concatenating the timestamp, the plug-in ID, the public ID and the client-side signed hash to form an authenticated plug-in URL that functions as a time-based security token, and
      loading, with a browser on the client device, the authenticated plug-in URL; and
   at the trusted server:
      receiving the time-based security token and a request for information about the client device from the non-trusted server,
      determining whether the time-based security token expired, and if the time-based security token has not expired,
      permitting the request for information about the client device to proceed in an authenticated session, otherwise denying the request for information about the client device.

2. The method of claim 1, wherein determining the signing key and the public ID includes parsing the cookie.

3. The method of claim 1 further comprising, by the trusted server:
   determining whether the request included the client-side signed hash; and
   if the request included the client-side signed hash, causing the plug-in to be displayed on a display of the client device, otherwise not causing the plug-in to be displayed on the display of the client device.

4. The method of claim 1, further comprising, by the non-trusted server:
   using the authenticated plug-in URL to determine the plug-in ID, the public ID, the timestamp and the client-side signed hash; and
   sending the plug-in ID, the public ID, the timestamp and the client side signed hash as the time-based security token to the trusted server.

5. The method of claim 1, wherein the timestamp is an indication of a time at which a client signed in to a website.

6. The method of claim 1, wherein the timestamp is an indication of a time at which a client signed in to a website and the time-based security token is configured to expire at a predetermined time after the time indicated by the timestamp.

7. The method of claim 1, wherein the signing key is not known to the plug-in.

8. A computer program product comprising at least one non-transitory computer readable medium storing a computer readable program:
   wherein a first portion of the computer readable program when executed on a client-side computer causes the client-side computer to perform steps comprising:
      receiving a cookie and a timestamp from a trusted server that is trusted by a user of the client-side computer,
      associating a plug-in identifier (ID) to correspond to a single plug-in that invokes a web service provided by a non-trusted server that is not trusted by the user of the client-side computer,
      determining a signing key and a public ID based at least in part on the cookie,
      concatenating the timestamp, the plug-in ID and the public ID to form an intermediate plug-in uniform resource locator (URL),
      hashing the intermediate plug-in URL using the signing key to form a client-side signed hash,
      concatenating the timestamp, the plug-in ID, the public ID and the client-side signed hash to form an authenticated plug-in URL that functions as a time-based security token, and
      loading the authenticated plug-in URL; and
   wherein a second portion of the computer readable program when executed on the trusted server causes the trusted server to perform steps comprising:
      receiving the time-based security token and a request for information about the client device from the non-trusted server,
      determining whether the time-based security token expired, and
      if the time-based security token has not expired, permitting the request for information about the client-side computer to proceed in an authenticated session, otherwise denying the request for information about the client device.

9. The computer program product of claim 8, further comprising a third portion of the computer readable program that, when executed on the non-trusted server, is configured to cause the non-trusted server to:
  use the authenticated plug-in URL to determine the plug-in ID, the public ID, the timestamp and the client-side signed hash; and
  send the plug-in ID, the public ID, the timestamp and the client side signed hash as the time-based security token to the trusted server.

10. The computer program product of claim 8, wherein the instructions to determine the signing key and the public ID include instructions to parse the cookie.

11. The computer program product of claim 8, wherein the executed computer readable program also causes the trusted server to:
  determine whether the request included the client-side signed hash; and
  if the requested included the client-side signed hash, causing the plug-in to be displayed on a display of the client-side computer, otherwise not causing the plug-in to be displayed on the display of the client-side computer.

12. The computer program product of claim 8, wherein the timestamp is an indication of a time at which a client signed in to a website.

13. The computer program product of claim 8, wherein the timestamp is an indication of a time at which a client signed in to a website and the time-based security token is configured to expire at a predetermined time after the time indicated by the timestamp.

14. The computer program product of claim 8, wherein the timestamp and the cookie are received from the trusted server that has access to user information.

15. The computer program product of claim 8, wherein the signing key is not known to the plug-in.

16. A system for client-side authentication, the system comprising:
  a client device that comprises:
  one or more first processors;
  a browser stored on a first memory and executable by the one or more first processors and communicatively coupled to a network, the browser configured to receive a cookie and a timestamp via the network from a trusted server that is trusted by a user of the client device and associate a plug-in identifier (ID) to correspond to single plug-in that invokes a web service provided by a non-trusted server that is not trusted by the user of the client device; and
  an authentication module communicatively coupled to the browser and configured to receive the cookie, the timestamp and the plug-in ID from the browser, the authentication module further configured to:
    determine a signing key and a public ID based at least in part on the cookie,
    concatenate the timestamp, the plug-in ID and the public ID to form an intermediate plug-in uniform resource locator (URL),
    hash the intermediate plug-in URL using the signing key to form a client-side signed hash,
    concatenate the timestamp, the plug-in ID, the public ID and the client-side signed hash to form an authenticated plug-in URL that functions as a time-based security token, and
    send the authenticated plug-in URL to the browser; and the trusted server that comprises:
  one or more second processors; and
  a verification module stored on a second memory and executed by the one or more second processors, the verification module configured to:
  receive the time-based security token and a request for information about the client device from the non-trusted server,
  determine whether the time-based security token expired, and
  if the time-based security token has not expired, permit the request for information about the client device to proceed in an authenticated session, otherwise deny the request for information about the client device.

17. The system of claim 16, further comprising the non-trusted server that comprises computer program instructions that are configured to, when executed, cause the non-trusted server to:
  use the authenticated plug-in URL to determine the plug-in ID, the public ID, the timestamp and the client-side signed hash; and
  send the plug-in ID, the public ID, the timestamp and the client-side signed hash as the time-based security token to the trusted server.

18. The system of claim 16, wherein the authentication module is also configured to determine the signing key and the public ID by parsing the cookie.

19. The system of claim 16, wherein the verification module is also configured to cause the trusted server to:
  determine whether the request included the client-side signed hash; and
  if the request included the client-side signed hash, causing the plug-in to be displayed on a display of the client device, otherwise not causing the plug-in to be displayed on the display of the client device.

20. The system of claim 16, wherein the timestamp is an indication of a time at which the client device signed in to a website.

21. The system of claim 16, wherein the timestamp is an indication of a time at which the client device signed in to a website and the time-based security token is configured to expire at a predetermined time after the time indicated by the timestamp.

22. The system of claim 16, wherein the trusted server is communicatively coupled to the network and has access to user information, and wherein the browser receives the timestamp and the cookie from the trusted server.

\* \* \* \* \*